(12) United States Patent
Arning et al.

(10) Patent No.: US 7,099,880 B2
(45) Date of Patent: Aug. 29, 2006

(54) SYSTEM AND METHOD OF USING DATA MINING PREDICTION METHODOLOGY

(75) Inventors: Andreas Arning, Rottenburg (DE); Martin Keller, Vaihingen (DE); Christoph Lingenfelder, Herrenberg (DE); Gregor Meyer, Loeningen (DE)

(73) Assignee: International Business Machines Corporation, Armonk, NY (US)

( * ) Notice: Subject to any disclaimer, the term of this patent is extended or adjusted under 35 U.S.C. 154(b) by 714 days.

(21) Appl. No.: 10/313,073

(22) Filed: Dec. 6, 2002

(65) Prior Publication Data
US 2003/0145000 A1    Jul. 31, 2003

(30) Foreign Application Priority Data
Jan. 31, 2002   (EP) .................................. 02002330

(51) Int. Cl.
   *G06F 17/00*    (2006.01)
   *G06F 7/00*     (2006.01)
(52) U.S. Cl. ........................... 707/100; 707/102
(58) Field of Classification Search .......... 707/1–10, 707/100–104.1, 200, 205; 706/6, 15, 11, 706/21; 705/52, 54; 711/100, 171
   See application file for complete search history.

(56) References Cited

U.S. PATENT DOCUMENTS

| | | | | |
|---|---|---|---|---|
| 5,884,305 A | * | 3/1999 | Kleinberg et al. | 707/6 |
| 5,970,482 A | * | 10/1999 | Pham et al. | 706/16 |
| 6,026,397 A | * | 2/2000 | Sheppard | 707/5 |
| 6,112,194 A | | 8/2000 | Bigus | 706/11 |
| 6,185,549 B1 | * | 2/2001 | Rastogi et al. | 706/45 |
| 6,185,561 B1 | * | 2/2001 | Balaban et al. | 707/6 |
| 6,629,095 B1 | * | 9/2003 | Wagstaff et al. | 707/5 |
| 6,718,336 B1 | * | 4/2004 | Saffer et al. | 707/102 |
| 6,799,181 B1 | * | 9/2004 | Vishnubhotla | 707/100 |
| 6,970,882 B1 | * | 11/2005 | Yao et al. | 707/102 |
| 2002/0083067 A1 | * | 6/2002 | Tamayo et al. | 707/100 |
| 2003/0229635 A1 | * | 12/2003 | Chaudhuri et al. | 707/6 |

* cited by examiner

*Primary Examiner*—Greta Robinson
*Assistant Examiner*—Jacques Veillard
(74) *Attorney, Agent, or Firm*—Samuel A. Kassatly

(57) ABSTRACT

A system and associated method for data mining prediction is presented according to which the user selects a database table by means of a graphical user interface. Some records in the table are complete, while other records are incomplete. A subset of records of the database table is determined wherein each record of the subset contains a data value in the column selected for prediction. This subset of records is used to generate a model by means of a data mining algorithm, such as linear regression, radial basis function, decision tree or neural network methods. The resulting model is then utilized to predict the empty data fields in the column. After completing the prediction, the predicted values are entered into the column for display to the user.

38 Claims, 3 Drawing Sheets input attributes / class label

| pain type | angina | num vessels | thal | diseased |
|---|---|---|---|---|
| 4 | 1 | 1 | 5 | Y |
| 3 | 0 | 0 | 7 | N |
| 2 | 1 | 2 | 4 | Y |
| 3 | 0 | 1 | 8 | N |
| 3 | 0 | 1 | 7 |   |
| 4 | 1 | 1 | 4 |   |

==>

| pain type | angina | num vessels | thal | diseased |
|---|---|---|---|---|
| 4 | 1 | 1 | 5 | Y |
| 3 | 0 | 0 | 7 | N |
| 2 | 1 | 2 | 4 | Y |
| 3 | 0 | 1 | 8 | N |
| 3 | 0 | 1 | 7 | *N* |
| 4 | 1 | 1 | 4 | *Y* |

FIG. 3

SYSTEM AND METHOD OF USING DATA MINING PREDICTION METHODOLOGY

PRIORITY CLAIM

The present application claims the priority of European Patent Application No. 02002330.5, titled "A Method of Using a Data Mining Prediction Methodology," Docket No. DE9-2001-0093, which was filed on Jan. 31, 2002, and which is incorporated herein by reference in its entirety.

FIELD OF THE INVENTION

The present invention relates to the field of data mining and in particular to providing a user interface for data mining prediction tasks.

BACKGROUND OF THE INVENTION

Data mining is a data processing task which is based on a structured set of raw data. Typically the raw data includes a large set of records, each record having the same or a similar format. Each field in a record can take any of a number of logical, categorical, or numerical values.

U.S. Pat. No. 6,112,194 describes a method for data mining including a feedback mechanism for monitoring performance of mining tasks is known. A user selected mining technique type is received for the data mining operation. A quality measure type is identified for the user selected mining technique type. The user selected mining technique type for the data mining operation is processed and a quality indicator is measured using the quality measure type. The measured quality indication is displayed while processing the user selected mining technique type for the data mining operations.

A common disadvantage of current mining methods is the complexity of the operations the user has to perform. FIG. 1 shows a typical example of a prior art data mining method:

First, table 1 with training data is provided. Table 1 contains a number of records having data fields which are assigned to input field values such as "pain type", "angina" ... Column 2 of table 1 has been selected by a user. The column 2 is associated with the field value "diseased".

Based on table 1 with column 2, a model 3 is formed by means of a data mining operation. In principle, any suitable current data mining method can be used such as linear regression, radial basis function and decision tree as well as neural network methods.

Model (or tree) 3 of FIG. 1 shows by way of example a decision tree model. The root of model 3 contains all the input records of table 1 and the leaves of model 3 represent the disjoint subsets which try to separate the records of table 1 according to the different field values occurring in column 2.

Model 3 is verified by means of test data which is contained in column 2 of table 4. By inputting the test data of table 4 and model 3 into the data mining application, column 5 is outputted containing data values that are predicted based on the input attributes contained in table 4 by means of model 3.

The predicted data in column 5 can be compared with the real data in column 2 in order to determine the quality of model 3. When the quality of model 3 is considered sufficient, application data provided in a table 6 and model 3 is inputted into the data mining application in order to predict the corresponding data values within column 5.

For performing the data mining task, the end user has to understand the different modes "training," "test," and "deployment" and needs to work with different types of data objects in the correct sequence. Furthermore, the end user needs to specify these objects correctly as input or output parameters:

the user needs to specify a table having a number of n+1 columns as input for the training mode;
a target column (column 2 of FIG. 1) needs to be specified for the purposes of prediction;
a model is outputted from the training mode;
a test data needs to be inputted into the test mode (table 4 with column 2 of FIG. 1);
the model needs to be specified as input into the test mode;
the output of the test mode is an n+2 column table comprising the additional column with the predicted data values (column 5 of FIG. 1);
the quality information which is outputted from the test mode needs to be evaluated;
the model needs to be specified as input into the deployment mode;
an n column table needs to be provided as an input for the deployment mode (application data); and
the result of the prediction is outputted in another column (column 5 of FIG. 1).

The complexity of the resulting user interface limits applications of data mining. What is therefore needed is an improved method for data mining, and in particular an improved user interface for data mining that allows non-expert users to perform data mining tasks.

SUMMARY OF THE INVENTION

The present invention satisfies this need and presents a system, a computer program product, and an associated method, including a user interface, for enabling a non-expert user to perform complex data mining tasks.

In accordance with a preferred embodiment of the invention the user selects a database table by means of a graphical user interface (GUI). The database table contains a number of records. Some of the records are complete, that is each data field within the record contains a data value. Other records of the database table are incomplete, that is at least one data field in such a record is empty.

The user selects a column of the database table for the prediction. The selection of the column can be done through a graphical user interface by "clicking" on that column.

A subset of records of the database table is determined as follows: each of the records of the subset contains a data value in the column selected for prediction. This subset of records with complete data fields is used to generate a model by means of a data mining algorithm, such as linear regression, radial basis function, decision tree or neural network methods.

This procedure is initiated by the user just by selecting the column. The resulting model is then utilized to predict the empty data fields in the column. After the prediction, the predicted values are entered into that column for display to the user.

In essence, this provides the user with a "look-and-feel" which is comparable to working with a spread sheet program. However, instead of simple spread sheet operations, complex data mining tasks are performed by relying on such a user friendly interface.

In accordance with a further preferred embodiment of the invention only a portion of the records containing a value in the column selected for prediction, are used for the model generation, and the other part is used for the purposes of testing the model. The portion can be absolute, or relative such as a percentage of data records, which are used for testing instead of model generation. This can be a predefined default value such as 10%.

In another preferred embodiment of the present invention, the quality of the model is determined as a result of the test and the quality is compared to another predefined default value. Only if this default value is reached or surpassed, the quality of the model is deemed sufficiently high for the prediction task.

In accordance with a further preferred embodiment of the invention also the quality of each individual prediction of data values is determined and compared to another predefined default value. Only if the quality is sufficient in comparison to the default value the corresponding data value is entered into the column of the table for display to the user.

In accordance with yet another preferred embodiment of the invention the default values can be modified by the user through the graphical user interface such as by making the appropriate selections in a pull down menu or by using tabs or similar graphical user entry means.

In accordance with a further preferred embodiment of the invention only the previously incomplete data records with the predicted data values are displayed as a result of the data mining operation. Alternatively, the format of the input table remains unchanged such that the previously empty data fields are filled with the predicted values.

In accordance with still another preferred embodiment of the present invention, the data mining method to be employed for the purpose of prediction is selected automatically. The automatic selection is performed depending on the data type of the column that is selected for the prediction. For example, the data mining method "tree classification" is automatically selected if a column with a categorical data type is selected and the data mining method "radial basis function" is automatically selected for a numerical data type.

It is not essential for the present invention that a user selects the column in the database table to initiate the prediction. The selection can also be performed automatically by means of a computer program or a client application. For example, the method of the invention is employed with respect to a database table having one or more columns with incomplete data. In this case the prediction methodology is employed iteratively with respect to each missing data in the table. This way the user does not need to manually select a particular column.

In case all or the vast majority of the data fields within the selected column of a database table are empty, it is advantageous to employ the data mining method of "clustering" instead of data prediction. In this case the data fields in the empty column are filled with cluster numbers or cluster ID's.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

FIG. 3 illustrates an example using the data mining method of FIG. 2.

DETAILED DESCRIPTION OF PREFERRED EMBODIMENTS

Figure 1:
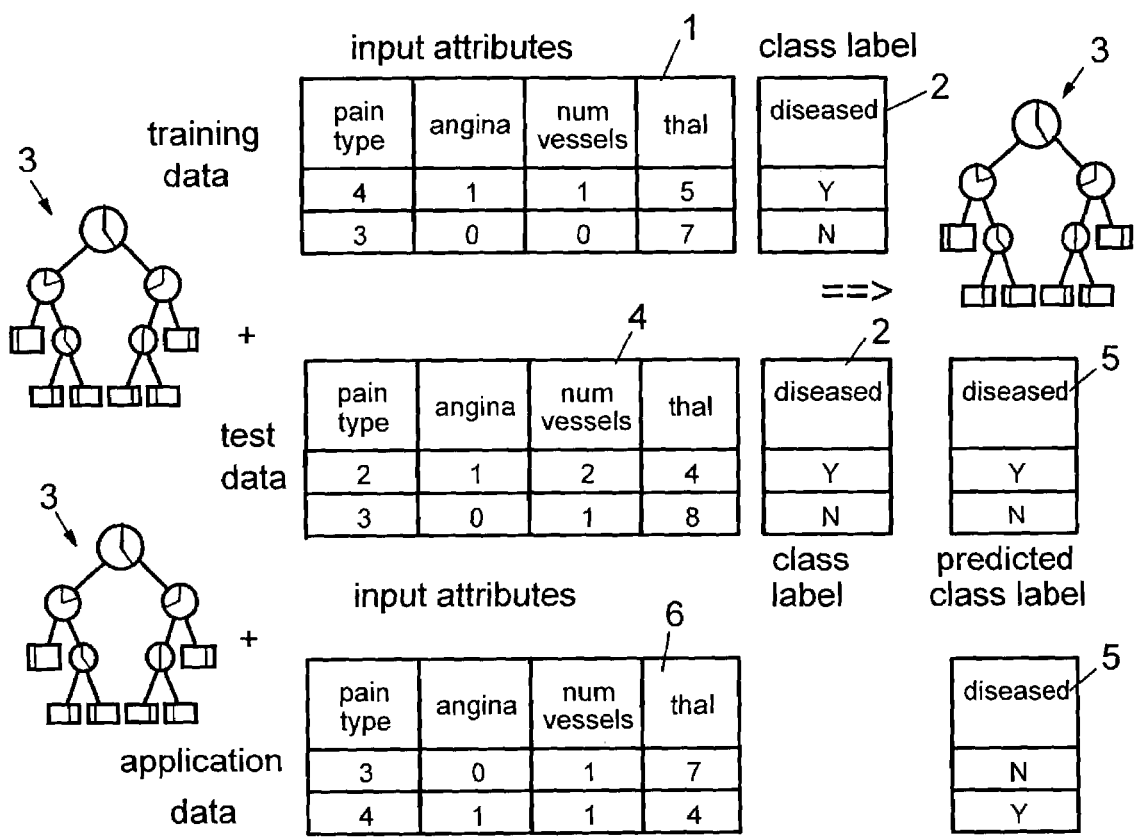
FIG. 1 represents a high level architecture of a prior art user interface for data mining tasks.
Figure 2:
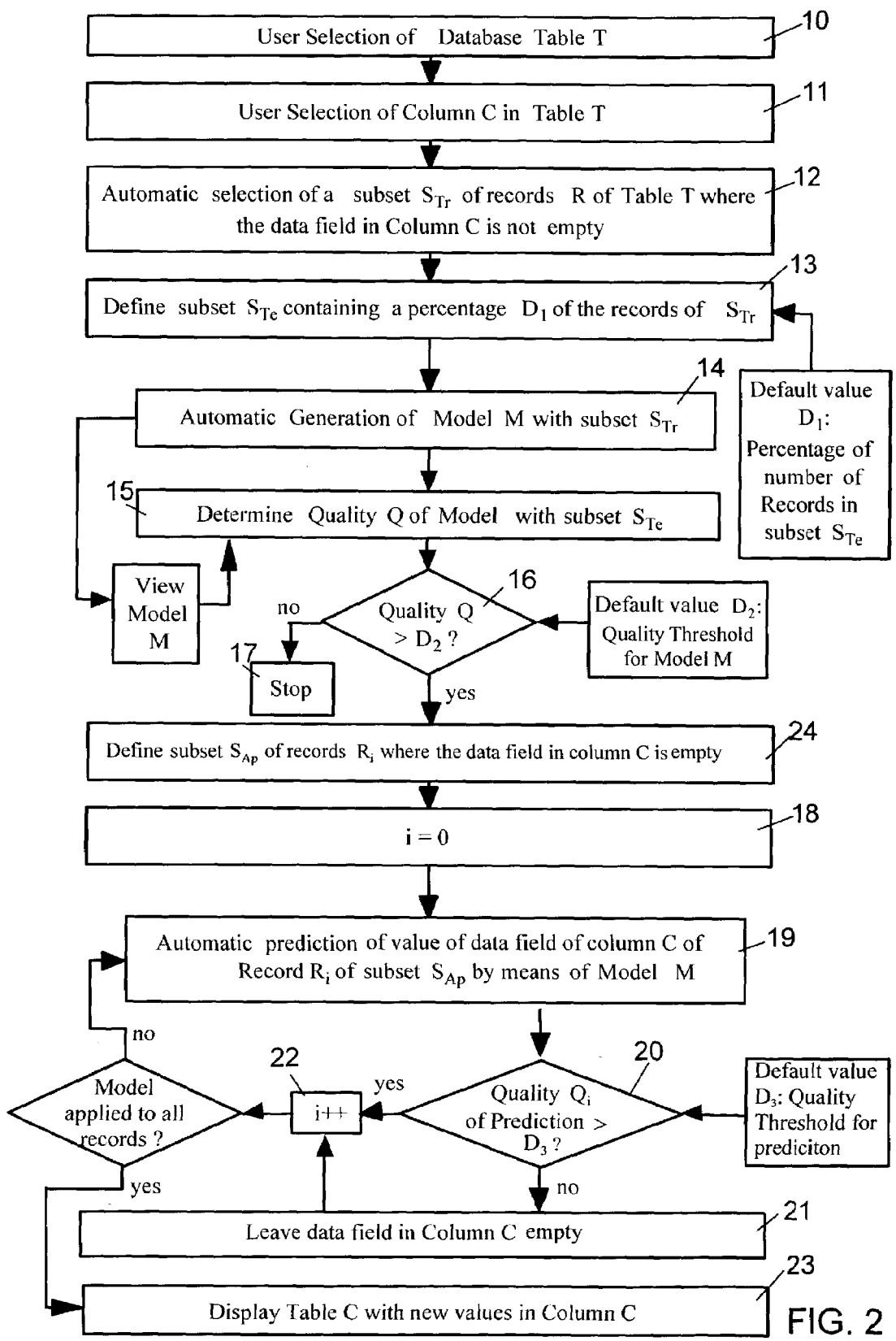
FIG. 2 is a process flow chart illustrating a data mining method of the present invention.

FIG. 2 shows a flow chart of a data mining method as implemented by a corresponding system or computer program product according to a preferred embodiment of the present invention. The data mining method or system includes a software programming code or computer program product that is typically embedded within, or installed on a host server. Alternatively, the system or method (i.e., algorithm) can be saved on a suitable storage medium such as a diskette, a CD, a hard drive, or like devices. While the present data mining system and associated method will be described in connection with a table database, it should be clear that the system and method can be used with networked database that may be access over the Internet and/or other available communication resources.

In step 10 the user selects a database table T. For example the table T contains a number of records of the database. Each record has a number of ordered data fields.

In step 11 the user selects one of the columns C of the table T. The selection of one of the columns C corresponds to the selection of a particular attribute to be predicted for incomplete records contained in the table T.

In step 12 a subset $S_{Tr}$ of records R of the table T is selected automatically. These records R of the subset $S_{Tr}$ have a data value in the data field of the selected column C.

In step 13 another subset $S_{Te}$ is defined as a subset of the subset $S_{Tr}$. The $S_{Te}$ contains a percentage $D_1$ of the records R of $S_{Tr}$. The percentage $D_1$ is a default value. This default value $D_1$ specifies the percentage of the number records R of the subset $S_{Tr}$ that belong to the subset $S_{Te}$. The percentage $D_1$ can also be equal to zero, which means that step 13 is skipped.

In step 14 a model M is generated automatically based on the subset $S_{Tr} \backslash S_{Te}$. In other words, the difference of the two subsets $S_{Tr}$ and $S_{Te}$ is determined in step 14; based on the difference of the two subsets the model M is automatically generated.

Optionally the user interface provides the user with an option to view the model M in a graphical representation. This is particularly advantageous for viewing decision trees.

In step 15 the quality Q of the model is determined by means of the subset $S_{Te}$. This done by using the records contained in the subset $S_{Te}$ as an input for the model in order to predict the data values within the column C.

The predicted data values within the column C are then compared to the actual data values in order to determine the quality Q. For example, the quality Q can be a percentage value that indicates the percentage of correct predictions of data values within the column C.

In step 16 the method decides whether the quality Q of the model M is sufficiently high. This is done by comparing the quality Q to a default value $D_2$. The default value $D_2$ determines a quality threshold for the model M. If it is decided in step 16 that the quality Q is not sufficient the method stops in step 17 and no prediction is performed. A corresponding comment is displayed for information of the user.

If it is decided in step 16 that the quality Q is sufficient, a subset $S_{Ap}$ of records $R_i$ of the table T is defined in step 24. The records $R_i$ of this subset $S_{Ap}$ have an empty data field in the column C.

The value of this empty data field is to be predicted by means of the following steps:

In step 18 the index i is initialized to zero.

In step 19 the value of the data field of column C of the record $R_i$ of the subset $S_{Ap}$ is predicted by means of the model M.

In step 20 the quality $Q_i$ of the prediction of this data value of the records $R_i$ is compared to the default value $D_3$. The default value $D_3$ specifies a quality threshold for the prediction. The quality of a prediction is also known as confidence.

If the quality $Q_i$ of the prediction is below the default value $D_3$ this means that the corresponding data field is left empty and the predicted data value is not entered into the table T (step 21). After step 21 the index i is incremented in step 22 and the control goes back to step 19.

If the test in step 20 has shown that the quality $Q_i$ of the prediction is sufficient the predicted data value is entered into the data field of the column C of the record $R_i$ under consideration and the index i is incremented in step 22. The steps 19 to 22 are carried out for all records $R_i$ the subset $S_{Ap}$. After that step 23 is carried out.

In step 23 at least the data fields in the column C with the predicted values are displayed. Preferably this is done by displaying the whole table T with the completed data fields of column C.

This way, an intuitive way of performing a data mining task is provided to a user: First, a data table T is shown to the user which has incomplete data records. The user can then choose one of the columns in the data table T for prediction of the missing data values.

Based on those records having a data value in the selected column C, a model M is determined by means of a data mining method. Optionally this model M is also tested automatically by using a portion of the complete records R of the table T that have not been used for producing the model M.

If a model of sufficient quality Q has been produced. The missing data values are automatically predicted and also automatically entered into the corresponding positions within database table T.

FIG. 3 shows a corresponding example. The user has selected a database table 7 containing a number of records. Some of the records are complete, i.e., the records do not contain empty data fields. Others records are incomplete, i.e., the records contain at least one empty data field. This is the case for the two records of the bottom of the table 7. The user has selected a column 8 of the table 7 as the "target."

In response to this, the method of FIG. 2 is performed with respect to the table 7. This means that a subset of the complete records of the table 7 is used to generate a model M by means of data mining techniques and that another subset of records of the table 7 is used to validate this model.

The two incomplete records are entered into the model in order to provide the predicted data values in column 8. The predicted data values are distinguished from the actual data values by a graphical symbol. In the present example, this graphical distinction is made by underlining the corresponding values and printing the data values in italics.

As an alternative, or in addition the confidence level for the prediction can also be illustrated by displaying symbolic information within the corresponding data fields with the predicted values. For example, the level of confidence of the prediction can be expressed by the color or size of the predicted data value or means of an indicator. It is further possible to sort the data records with the predicted data values in accordance with the confidence of the prediction.

Instead of having the user specify a table and a column of this table, it is also possible that the user only specifies the table. In this case, the prediction method of FIG. 2 is carried out automatically for each of the columns. Instead of computing the estimated value only for the incomplete records with missing data values in the target field, a predicted value can as well be computed for records where this value is present. A comparison between the predicted and the actual value can than be used for deviation detection. This is an alternative mode of operation that can be selected automatically when the user selected target column does not contain any missing values.

What is claimed is:

1. A processor-implemented data mining method, comprising:
   selecting a column in a database table containing records;
   automatically selecting a First subset of records in the database table, wherein each one of the records has a value in the column that is not empty;
   automatically generating a data mining model from the first subset of records;
   automatically determining a second subset of records in the database table, wherein each record in the second subset has an empty value in the column; and
   automatically providing predicted data values for the records of the second subset using the data mining model.

2. The method of claim 1, further comprising inserting the predicted data values in the column.

3. The method of claim 2, further comprising displaying the predicted data values.

4. The method of claim 2, further comprising defining a third subset of records containing a predetermined percentage of records of the first subset.

5. The method of claim 4, further comprising determining a quality of the data mining model using the third subset of records.

6. The method of claim 2, further comprising determining a prediction quality for each of the records of the second subset using the data mining model.

7. The method of claim 6, further comparing the quality of the data mining model to a default parameter value.

8. The method of claim 7, further comprising modifying the default parameter value.

9. The method of claim 2, further comprising displaying the database table.

10. The method of claim 2, further comprising visually marking the column that has been selected.

11. The method of claim 10, wherein visually marking comprises highlighting the column that has been selected.

12. The method of claim 2, further comprising visually marking the predicted data values.

13. The method of claim 2, further comprising displaying the second subset of records along with the predicted data values.

14. The method of claim 13, wherein generating the data mining model comprises automatically selecting a data mining algorithm depending on the data type of the selected column.

15. The method of claim 2, further comprising iteratively predicting the empty value of each second subset record.

16. The method of claim 2, further comprising employing a data clustering algorithm if the selected column is empty.

17. The method of claim 1, wherein selecting the column comprises using a graphical user interface.

18. A computer program product having instruction codes stored on a computer-usable medium for implementing data mining tasks onto a database table that includes a selected column containing records, the computer program product comprising:

a first set of instruction codes f or automatically selecting a first subset of records in the database table, wherein each one of the records has a value in the column that is not empty;

a second set of instruction codes f or automatically generating a data mining model from the first subset of records;

a third set of instruction codes for automatically determining a second subset of records in the database table, wherein each record in the second subset has an empty value in the column; and a fourth set of instruction codes for automatically providing predicted data values for the records of the second subset using the data mining model.

19. The method of claim 18, further comprising a fifth set of instruction codes for inserting the predicted data values in the column.

20. The computer program product of claim 19, wherein the third set of instruction codes further defines a third subset of records containing a predetermined percentage of records of the first subset.

21. The computer program product of claim 20, wherein the fourth set of instruction codes further determines a quality of the data mining model using the third subset of records.

22. The computer program product of claim 19, wherein the fourth set of instruction codes further determines a prediction quality for each of the records of the second subset using the data mining model.

23. The computer program product of claim 22, wherein the fourth set of instruction codes further compares the quality of the data mining model to a default parameter value.

24. The computer program product of claim 23, wherein the default parameter value is variable.

25. The computer program product of claim 19, further comprising a sixth set of instruction codes for visually marking the predicted data values.

26. The computer program product of claim 19, wherein the second set of instruction codes automatically selects a data mining algorithm depending on the data type of the selected column.

27. The computer program product of claim 19, wherein the fourth set of instruction codes further employs a data clustering algorithm it the selected column is empty.

28. A processor-implemented system for implementing data mining tasks onto a database table that includes a selected column containing records, the system comprising:

means for automatically selecting a first subset of records in the database table, wherein each one of the records has a value in the column that is not empty;

means for automatically generating a data mining model from the first subset of records;

means for automatically determining a second subset of records in the database table, wherein each record in the second subset has an empty value in the column; and means for automatically providing predicted data values for the records of the second subset using the data mining model.

29. The method of claim 28, further comprising means for inserting the predicted data values in the column.

30. The system of claim 29, wherein the means for automatically determining the second subset of records further defines a third subset of records containing a predetermined percentage of records of the first subset.

31. The system of claim 30, wherein the means for automatically providing predicted data values further determines a quality of the data mining model using the third subset of records.

32. The system of claim 29, wherein the means for automatically providing the predicted data values further determines a prediction quality for each of the records of the second subset using the data mining model.

33. The system of claim 31, wherein the means for automatically providing predicted data values further compares the quality of the data mining model to a default parameter value.

34. The system of claim 33, wherein the default parameter value is variable.

35. The system of claim 29, further comprising means for visually marking the predicted data values.

36. The system of claim 29, wherein the means for automatically generating the data mining model automatically selects a data mining algorithm depending on the data type of the selected column.

37. The system of claim 29, wherein the means for automatically providing the predicted data values iteratively predicts the empty value of each second subset record.

38. The system of claim 29, wherein the means for automatically providing the predicted data values further employs a data clustering algorithm if the selected column is empty.

* * * * *